(12) United States Patent　　(10) Patent No.: US 8,943,240 B1
Subramanian　　(45) Date of Patent: Jan. 27, 2015

(54) DIRECT MEMORY ACCESS AND RELATIVE ADDRESSING

(71) Applicant: Xilinx, Inc., San Jose, CA (US)

(72) Inventor: Ramesh R. Subramanian, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 147 days.

(21) Appl. No.: 13/803,920

(22) Filed: Mar. 14, 2013

(51) Int. Cl.
*G06F 3/00* (2006.01)
*G06F 13/00* (2006.01)
*G06F 13/28* (2006.01)
*G06F 5/06* (2006.01)

(52) U.S. Cl.
CPC ............... *G06F 13/28* (2013.01); *G06F 5/065* (2013.01); *G06F 3/00* (2013.01)
USPC .................................. 710/26; 710/28; 710/52

(58) Field of Classification Search
CPC ............ G06F 13/28; G06F 3/00; G06F 5/065
See application file for complete search history.

(56) References Cited

U.S. PATENT DOCUMENTS

2003/0172224 A1* 9/2003 Gulick et al. .................... 711/1

* cited by examiner

*Primary Examiner* — Zachary K Huson
(74) *Attorney, Agent, or Firm* — Kevin T. Cuenot

(57) ABSTRACT

A direct memory access circuit includes a buffer handler configured to store received data within a buffer in a buffer memory coupled to the direct memory access circuit and to generate a descriptor for the buffer. The direct memory access circuit further includes a descriptor handler coupled to the buffer handler. The descriptor handler is configured to determine a descriptor address for the descriptor and to store the descriptor at the determined address within a descriptor memory coupled to the direct memory access circuit.

20 Claims, 13 Drawing Sheets

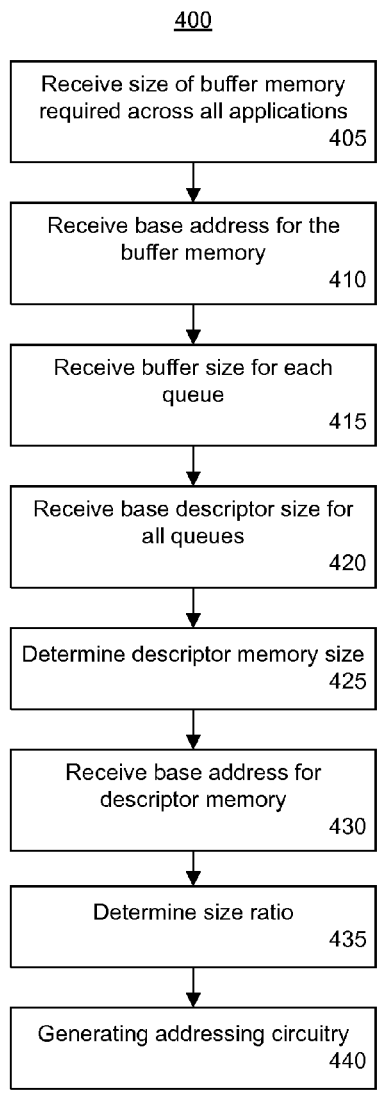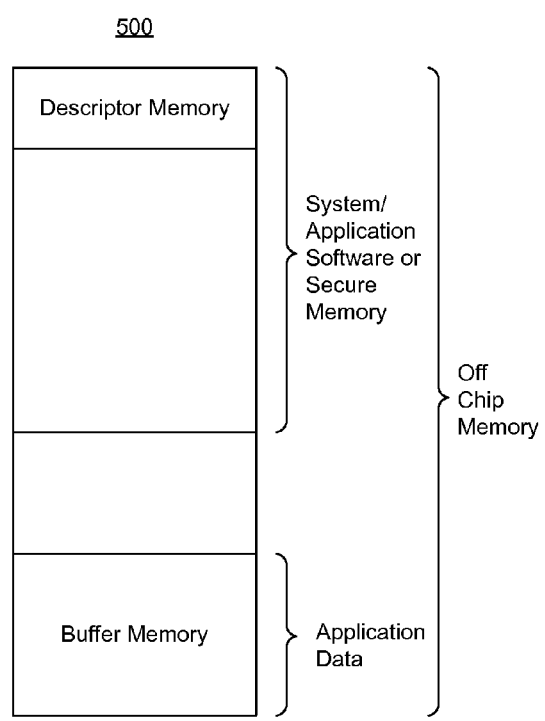
FIG. 4
FIG. 5

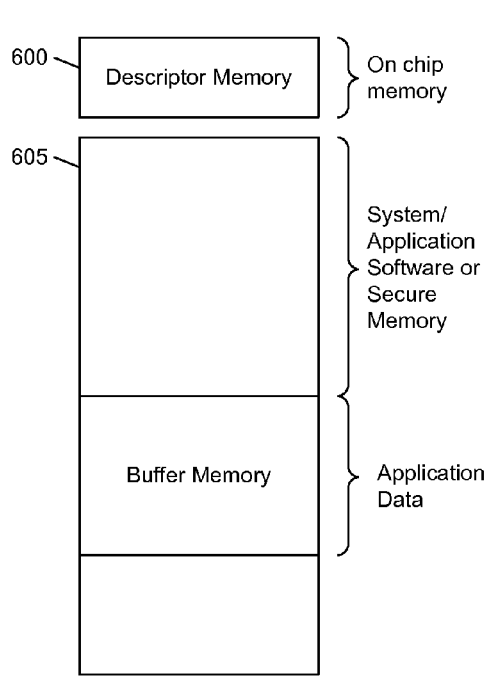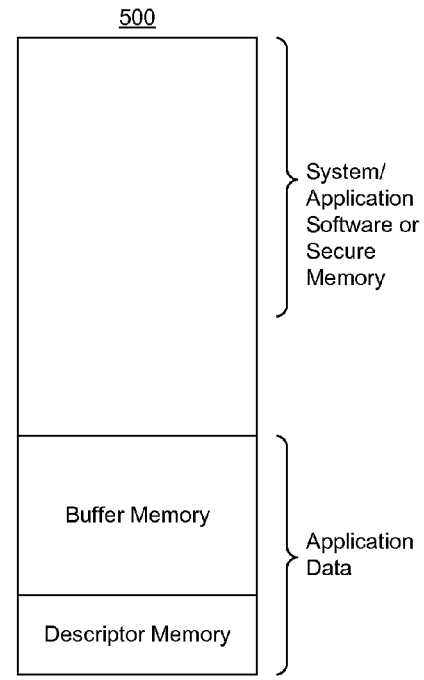
FIG. 6  FIG. 7
| Bits | 1 | 1 | 1 | 1 | 12 | 8 | 8 |
|---|---|---|---|---|---|---|---|
| Word 1 | Load | Rollvr | Start | Last | Bytes | TDEST | TID |
| Word 2 | Extended Descriptor Field ||||||| 
| Word 3 | Current Buffer Address (CBA) ||||||| 
| Word 4 | Next Descriptor Address (NDA) ||||||| 
FIG. 8

900

| Load | Indicates a new queue or first buffer of the queue |
|---|---|
| Rollover (Rollvr) | Indicates rollover buffer or last buffer of the circular buffer queue |
| Start | Indicates a first buffer of a packet when set |
| Last | Indicates a last buffer of a packet when set |
| Bytes | Is the number of valid bytes in the associated buffer |
| TDEST | Specifies a destination stream identifier for a packet |
| TID | Indicates source stream identifier for a packet |
| Extended Descriptor Field | Field can be extended up to 7 words by an application circuit. Size of the Extended Descriptor Field is determined by [configured descriptor size – DMA control word, i.e. 4 bytes]. Extended descriptor field can be used by the application circuits to exchange application-specific control information between the application interface and the processor. |
| CBA | Address of Buffer associated with descriptor |
| NDA | Address of next descriptor in the ring |

FIG. 9

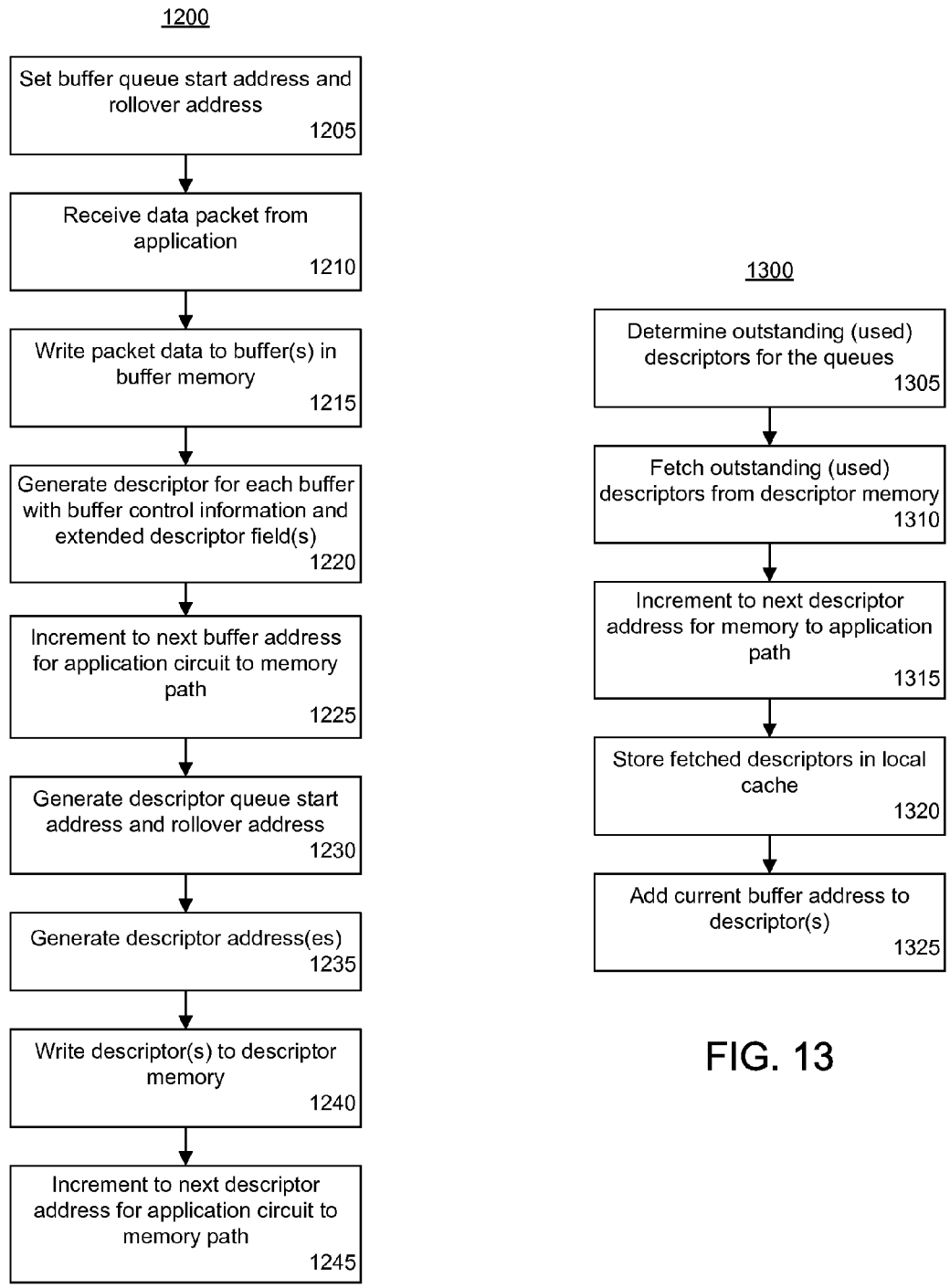

| Queue # | Allocated Space (MB) | Configured Buffer Size | Buffer Base Address | Buffer High Address | Calc space for Desc in KB | Descriptor Base Address | Descriptor High Address |
|---|---|---|---|---|---|---|---|
| 0 | 1 | 2048 | E0000000 | E00FF000 | 4 | F0000000 | F0000FF0 |
| 1 | 2 | 4096 | E0100000 | E02FF000 | 8 | F0001000 | F0002FF0 |
| 2 | 4 | 4096 | E0300000 | E06FF000 | 16 | F0003000 | F0006FF0 |
| 3 | 8 | 2048 | E0700000 | E0EFF000 | 32 | F0007000 | F000EFF0 |
| 4 | 16 | 4096 | E0F00000 | E1EFF000 | 64 | F000F000 | F001EFF0 |
| 5 | 32 | 4096 | E1F00000 | E3EFF000 | 128 | F001F000 | F003EFF0 |
| 6 | 64 | 2048 | E3F00000 | E7EFF000 | 256 | F003F000 | F007EFF0 |
| 7 | 128 | 2048 | E7F00000 | EFEFF000 | 512 | F007F000 | F00FEFF0 |
| Buff_Mem_Size = | 29 | | Desc_Mem_Size = | | 21 | Size_Ratio | 8 |

| Queue # | Allocated Space (MB) | Configured Buffer Size | Buffer Base Address | Buffer High Address | Calc space for Desc in KB | Descriptor Base Address | Descriptor High Address |
|---|---|---|---|---|---|---|---|
| 0 | 1 | 1024 | E0000000 | E00FF000 | 4 | F0000000 | F0000FF0 |
| 1 | 2 | 2048 | E0100000 | E02FF000 | 8 | F0001000 | F0002FF0 |
| 2 | 4 | 4096 | E0300000 | E06FF000 | 16 | F0003000 | F0006FF0 |
| 3 | 8 | 2048 | E0700000 | E0EFF000 | 32 | F0007000 | F000EFF0 |
| 4 | 16 | 4096 | E0F00000 | E1EFF000 | 64 | F000F000 | F001EFF0 |
| 5 | 32 | 1024 | E1F00000 | E3EFF000 | 128 | F001F000 | F003EFF0 |
| 6 | 64 | 2048 | E3F00000 | E7EFF000 | 256 | F003F000 | F007EFF0 |
| 7 | 128 | 4096 | E7F00000 | EFEFF000 | 512 | F007F000 | F00FEFF0 |
| Buff_Mem_Size = | 29 | Desc_Mem_Size = | | | 21 | Size_Ratio | 8 |

| Queue # | Allocated Space (MB) | Configured Buffer Size | Buffer Base Address | Buffer High Address | Calc space for Desc in KB | Descriptor Base Address | Descriptor High Address |
|---|---|---|---|---|---|---|---|
| 0 | 1 | 512 | E0000000 | E00FFE00 | 64 | F0000000 | F000FFE0 |
| 1 | 2 | 512 | E0100000 | E02FFE00 | 128 | F0010000 | F002FFE0 |
| 2 | 4 | 512 | E0300000 | E06FFE00 | 256 | F0030000 | F006FFE0 |
| 3 | 8 | 512 | E0700000 | E0EFFE00 | 512 | F0070000 | F00EFFE0 |
| 4 | 16 | 512 | E0F00000 | E1EFFE00 | 1024 | F00F0000 | F01EFFE0 |
| 5 | 32 | 512 | E1F00000 | E3EFFE00 | 2048 | F01F0000 | F03EFFE0 |
| 6 | 64 | 512 | E3F00000 | E7EFFE00 | 4096 | F03F0000 | F07EFFE0 |
| 7 | 128 | 512 | E7F00000 | EFEFFE00 | 8192 | F07F0000 | F0FEFFE0 |
| Buff_Mem_Size = | 29 | | Desc_Mem_Size = | | 25 | Size_Ratio | 4 |

| Queue # | Allocated Space (MB) | Configured Buffer Size | Buffer Base Address | Buffer High Address | Calc space for Desc in KB | Descriptor Base Address | Descriptor High Address |
|---|---|---|---|---|---|---|---|
| 0 | 1 | 4096 | E0000000 | E00FF000 | 4 | F0000000 | F0000FF0 |
| 1 | 2 | 4096 | E0100000 | E02FF000 | 8 | F0001000 | F0002FF0 |
| 2 | 4 | 4096 | E0300000 | E06FF000 | 16 | F0003000 | F0006FF0 |
| 3 | 8 | 4096 | E0700000 | E0EFF000 | 32 | F0007000 | F000EFF0 |
| 4 | 16 | 4096 | E0F00000 | E1EFF000 | 64 | F000F000 | F001EFF0 |
| 5 | 32 | 4096 | E1F00000 | E3EFF000 | 128 | F001F000 | F003EFF0 |
| 6 | 64 | 4096 | E3F00000 | E7EFF000 | 256 | F003F000 | F007EFF0 |
| 7 | 128 | 4096 | E7F00000 | EFEFF000 | 512 | F007F000 | F00FEFF0 |
| Buff_Mem_Size = | 29 | | Desc_Mem_Size = | | 21 | Size_Ratio | 8 |

DIRECT MEMORY ACCESS AND RELATIVE ADDRESSING

TECHNICAL FIELD

This specification relates to electronic systems and, more particularly, to direct memory access (DMA) circuitry that uses a relative addressing scheme.

BACKGROUND

Direct memory access (DMA) is a technology that allows different parts of a system to access memory without the involvement of a central processing unit (CPU). Without DMA, any data that is to be stored within system memory, e.g., random access memory, flows through the CPU. Not all data that is to be stored within system memory, however, requires processing by the CPU for storage in system memory. Data that does not require CPU processing is a candidate for DMA technology since sub-system(s) can read and/or write data directly to/from the system memory by way of DMA circuitry without CPU involvement.

Typical DMA circuitry utilizes memory that is partitioned to implement storage for buffers and for descriptors. Each buffer is used to store user data. Each descriptor stores descriptive information for a particular buffer storing user data. In general, descriptors are linked together to build queues which are sometimes referred to as "linked lists." The DMA circuitry utilizes these queues to send and receive data from the shared memory space.

SUMMARY

A direct memory access circuit includes a buffer handler configured to store received data within a buffer in a buffer memory coupled to the direct memory access circuit and to generate a descriptor for the buffer. The direct memory access circuit further includes a descriptor handler coupled to the buffer handler. The descriptor handler is configured to determine a descriptor address for the descriptor and to store the descriptor at the determined descriptor address within a descriptor memory coupled to the direct memory access circuit.

A method of data processing includes storing data from a first application circuit within a buffer in a buffer memory and generating, within a direct memory access circuit, a descriptor for the buffer. The method further includes generating, within the direct memory access circuit, an address for the descriptor according to an address of the buffer to which the descriptor corresponds. The descriptor can be written to a descriptor memory according to the address of the descriptor.

A method of determining addressing for a direct access memory block includes receiving, using a central processing unit, a user input specifying a size of a buffer memory required for managing a plurality of queues, receiving, using the central processing unit, a base address for the buffer memory, and receiving, using the central processing unit, a user input specifying a buffer size for each queue. The method further includes calculating, using the central processing unit, a size of descriptors stored in the descriptor memory by determining a product of the buffer memory size and the base descriptor size and dividing the product by a smallest buffer size used for the queues.

BRIEF DESCRIPTION OF THE DRAWINGS

FIG. 4 is a flow chart illustrating an exemplary method of processing hardware generation parameters.

FIG. 5 is a block diagram illustrating a memory with an exemplary base address configuration.

FIG. 6 is a block diagram illustrating a plurality of memories with another exemplary base address configuration.

FIG. 7 is a block diagram illustrating a memory with another exemplary base address configuration.

FIG. 8 is a table illustrating descriptor size compression as implemented by the DMA block of FIG. 2.

FIG. 9 is a table illustrating various items of information for a descriptor.

FIG. 12 is a flow chart illustrating an exemplary method of data transfer from an application circuit to memory.

FIG. 13 is a flow chart illustrating an exemplary method of descriptor caching.

FIG. 15 is a table illustrating exemplary relative addressing for a first variable size buffer space.

FIG. 16 is a table illustrating exemplary relative addressing for a second variable size buffer space.

FIG. 17 is a table illustrating exemplary relative addressing for a first fixed size buffer space.

FIG. 18 is a table illustrating exemplary relative addressing for a second fixed size buffer space.

DETAILED DESCRIPTION

While the specification concludes with claims defining novel features, it is believed that the various features disclosed within this specification will be better understood from a consideration of the description in conjunction with the drawings. The process(es), machine(s), manufacture(s) and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

This specification relates to electronic systems and, more particularly, to direct memory access (DMA) circuitry that uses a relative addressing scheme. In accordance with the inventive arrangements disclosed within this specification, a relative addressing scheme is used by DMA circuitry for managing buffer memory and descriptor memory. The DMA circuitry is configured to support one or more applications, thereby implementing a centralized DMA that is accessible to multiple applications sharing a common memory.

For purposes of simplicity and clarity of illustration, elements shown in the figures have not necessarily been drawn to scale. For example, the dimensions of some of the elements may be exaggerated relative to other elements for clarity.

Further, where considered appropriate, reference numbers are repeated among the figures to indicate corresponding, analogous, or like features.

Figure 1:
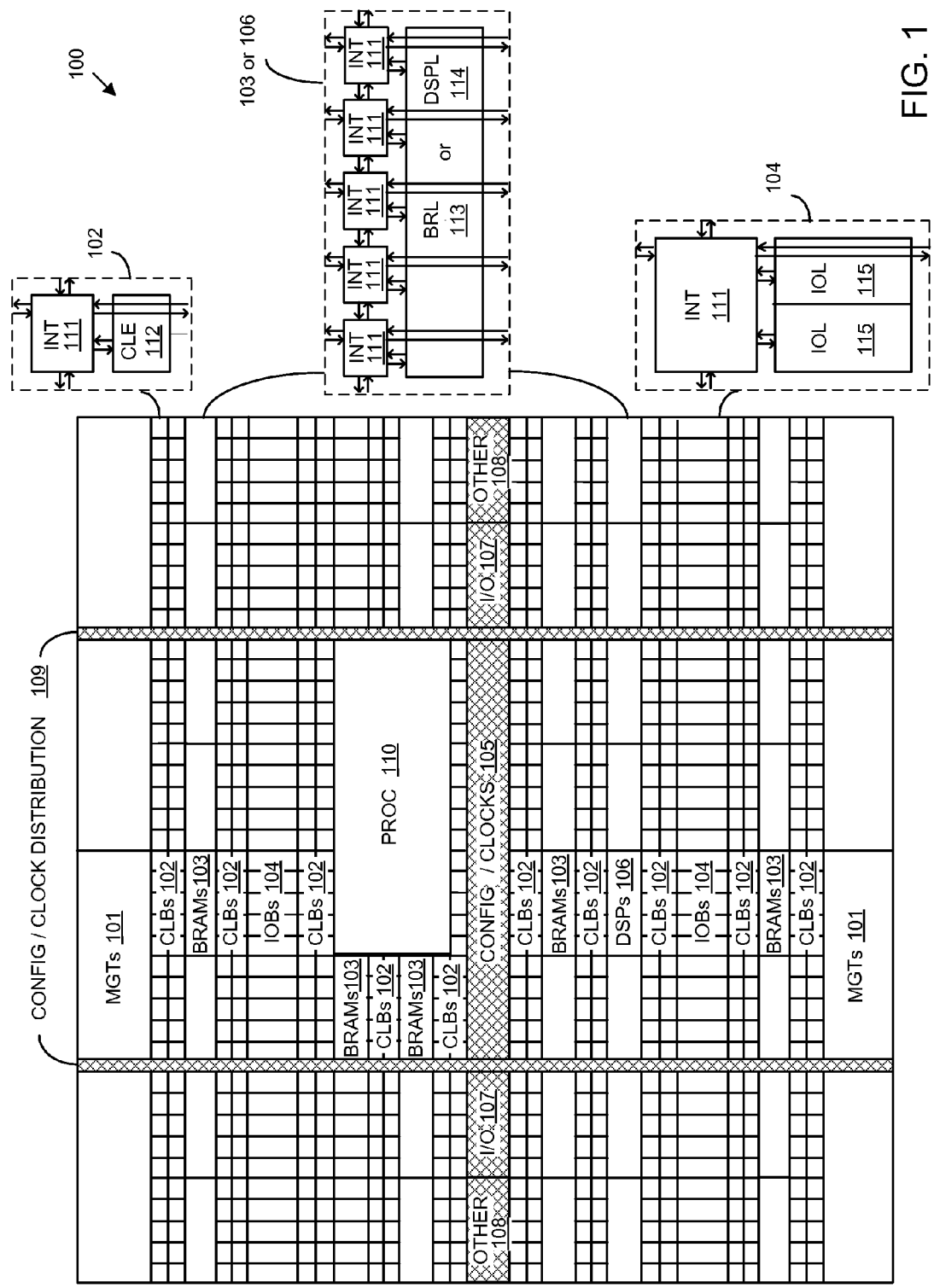
FIG. 1 is a block diagram illustrating an exemplary architecture for an integrated circuit.

FIG. 1 is a block diagram illustrating an exemplary architecture 100 for an IC. Architecture 100 can be implemented within a field programmable gate array (FPGA) type of IC, for example. As shown, architecture 100 includes several different types of programmable circuit, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, the INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. In the pictured embodiment, a BRAM tile has the same height as five CLBs, but other numbers (e.g., four) also can be used. A DSP tile 106 can include a DSP logic element (DSPL) 114 in addition to an appropriate number of INTs 111. An IOB 104 can include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, can be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, DMA blocks, or the like.

In another aspect, PROC 110 is omitted from architecture 100 and replaced with one or more of the other varieties of the programmable blocks described. Further, such blocks can be utilized to form a "soft processor" in that the various blocks of programmable circuitry can be used to form a processor that can execute program code as is the case with PROC 110. In another aspect, whether PROC 110 is implemented as a hardwired processor or a soft processor, a DMA block can be implemented using the programmable circuitry of architecture 100 and interface with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 110 within the IC are for purposes of illustration only and are not intended as a limitation of the one or more embodiments disclosed within this specification.

Figure 2:
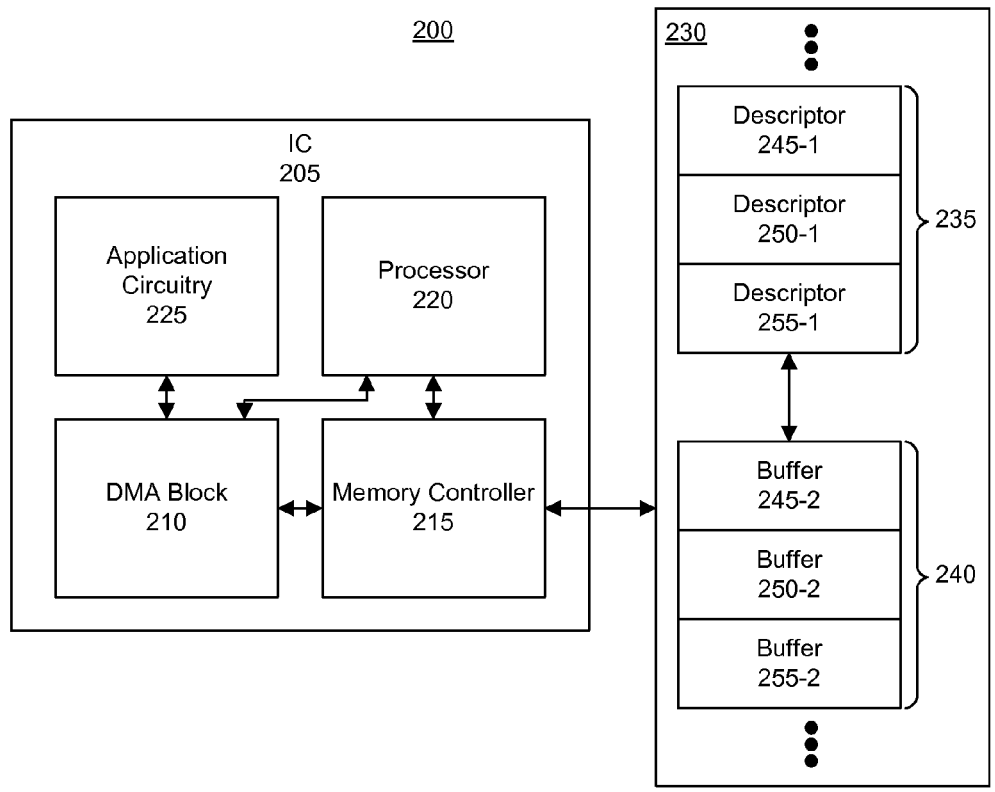
FIG. 2 is a block diagram illustrating an example of an electronic system configured to access an external memory using direct memory access.

FIG. 2 is a block diagram illustrating an example of an electronic system (system) 200 that utilizes an external memory using DMA. In one aspect, system 200 can be implemented within an IC having an architecture that is the same as, or similar to, architecture 100 of FIG. 1. For purposes of illustration, system 200 is shown in simplified form. As pictured, system 200 includes an integrated circuit (IC) 205 and a memory 230. Memory 230 is illustrated as an external memory. As used within this specification, an "external" memory is a memory that is not located within IC 205 and, as such, is considered "off-chip."

IC 205 includes a DMA block 210, a memory controller 215, a processor 220, and application circuitry 225. DMA block 210 is connected to memory controller 215. Memory controller 215 is connected to memory 230. Processor 220 is connected to DMA block 210 and to memory controller 215. Application circuitry 225 is connected to DMA block 210. It should be appreciated that in some cases, application circuitry 225 is connected to memory controller 215 and/or to processor 220.

DMA block 210 is an electronic circuit configured to allow various other circuits and/or sub-systems collectively referred to as application circuitry 225 to directly access external memory 230. In one aspect, DMA block 210 is implemented using programmable circuitry within IC 205. Memory controller 215 is an electronic circuit that manages the flow of data into and out from memory 230. Memory controller 215 provides the signals necessary to control operations within memory 230 such as read and write operations. In one example, memory controller 215 is a Dual Data Rate (DDR) memory controller. In that case, memory 230 is a DDR memory. It should be appreciated that the examples described are not intended to be limited to DDR memory and that other memory types and corresponding memory controllers can be used. Processor 220 is a central processing unit, a core, or the like that is configured to execute program code.

Application circuitry 225 represents one or more other circuits and/or sub-systems of IC 205. Each circuit or sub-system is referred to as an "application circuit." For purposes of illustration, it can be assumed that one or more of the application circuits represented by application circuitry 225 require access to external memory 230. DMA block 210, as noted, provides each application circuit with access to memory 230.

For purposes of illustration, memory 230 is shown to include a single queue. A queue is formed of one or more descriptors and one or more buffers. Descriptors correspond to, or are associated with, buffers on a one-to-one basis. Queues and application circuits also correspond to one another on a one-to-one basis. Though illustrated as having a single queue, it should be appreciated that memory 230 can include a plurality of queues used by a plurality of application circuits implemented within application circuitry 225. In this regard, memory 230 can support shared access by a plurality of different application circuits. DMA block 210 is configured to provide each of a plurality of application circuits implemented within application circuitry 225 with shared access to memory 230, e.g., where each application circuit is able to access its own queue.

In implementing a queue, memory 230 is subdivided into two different portions shown as descriptor memory 235 and buffer memory 240. As pictured, descriptor memory 235 includes descriptors 245-1, 250-1, and 255-1. Buffer memory 240 includes buffers 245-2, 250-2, and 255-2. Descriptor 245-1 is correlated, or associated, with buffer 245-2. More particularly, descriptor 245-1 stores control information for buffer 245-2. Similarly, descriptor 250-1 stores control information for buffer 250-2. Finally, descriptor 255-1 stores control information for buffer 255-2.

DMA block 210 supports various functions that provide application circuits implemented within application circuitry 225 with a high level of flexibility. In one aspect, DMA block 210 is configured to build dynamic circular buffers within memory 230 provided that the relevant application circuits each provide a start and a rollover address for the queue to be formed. In that case, DMA block 210 allocates memory space for each queue based upon application circuit need. Dynamic allocation allows DMA block 210 to allocate free address space or de-allocate used address space at run time.

Application circuits further are able to define buffer sizes. Each application circuit sharing memory 230 is permitted to configure the buffer size based upon the application requirement. As an example, consider the case of networking traffic having an average size of 512 bytes. A networking traffic application circuit can set buffer size to 256 or 512 bytes via DMA block 210 to utilize memory in a more optimal manner. By comparison, video traffic typically includes large, fixed frames of video data. In that case, a video traffic application circuit may define larger size buffers in and around an upper limit of approximately 4096 bytes. Both application circuits can define queues as described concurrently within memory 230 and access such queues using DMA block 210.

In another aspect, DMA block 210 supports descriptor size compression. Descriptor size compression is a technique applied by DMA block 210 that reduces the size, i.e., number of bytes, stored for a descriptor within descriptor memory 235. In one aspect, descriptor size compression is implemented by storing only buffer control information within descriptor memory 235. As defined within this specification, buffer control information does not include information such as a buffer address pointer or a next descriptor pointer. As such, in the case of a circular buffer, only the buffer control information is stored as part of a descriptor in descriptor memory 235. The buffer address pointer and the next descriptor pointer are data items that can be determined by DMA block 210 and added to the descriptor after DMA block 210 fetches the descriptor, formed only of control information, from memory 230.

DMA block 210 further can be configured to utilize a relative addressing scheme. The relative addressing scheme allows DMA block 210 to generate a descriptor address from a buffer address and generate a buffer address from a descriptor address. This ability simplifies high speed descriptor caching operations. Moreover, the bandwidth needed to support data transactions between DMA block 210 and memory 230, by way of memory controller 215, is reduced. Only a single write and a single read are then needed for each descriptor in descriptor memory 235. Processor 220 can access descriptors cached locally within DMA block 210, thereby eliminating overhead for per queue descriptor management.

Implementation of relative addressing does not require any hardware. Rather, the relative addressing is derived from, or calculated using, the buffer memory size, i.e., the total allocated space for all application circuits, and the descriptor memory size, i.e., the total required descriptor space for all application circuits. The relative addressing scheme ensures that the same equation applies for variable buffer sizes across multiple different queues. One underlying principle of relative addressing is that a one-to-one relationship should always be maintained between a buffer address and the address of the corresponding descriptor (e.g., the corresponding descriptor address).

In order to implement relative addressing within DMA block 210, the following three rules, which are referenced throughout this specification, are preferably observed:

1. The address range of a buffer memory is restricted to have a size in bytes that is a power of 2. Further, the address range of the buffer memory can be address-aligned. This means that for an address range of size $2^N$, where N is an integer, the N least significant bits of the base address are 0 and the N least significant bits of the high address are 1. For example, a buffer memory with an addressable range of 512MB ($2^{29}$) can have a base address of 0xE0000000 and a high address of 0xFFFFFFFF.

2. The address range of a descriptor memory is restricted to have a size in bytes that is a power of 2. Further the address range of the descriptor memory can be address-aligned. This means that for an address range of size $2^M$, where M is an integer, the M least significant bits of the base address are 0 and the M least significant bits of the high address are 1. For example, a descriptor memory with an addressable range of 2MB ($2^{21}$) can have a base address of 0xF0000000 and a high address of 0xF01FFFFF.

3. The start address and the rollover address for each queue should be at the largest buffer size address boundary. For example, if the buffer size configurations are 512 bytes, 1024 bytes, 2048 bytes, and 4096 bytes, the start address and the rollover address for each queue should be at a 4096 byte address boundary. This means when the largest buffer size is 4096 bytes, the 12 least significant bits of the start and rollover address should be 0.

The relative addressing implemented by DMA block 210 depends upon three parameters including descriptor memory size (desc_mem_size), buffer memory size (buff_mem_size), and size ratio (size_ratio). Each of the three parameters is defined below.

desc_mem_size=Log 2[calculated descriptor space]

buff_mem_size=Log 2[allocated buffer space]

size_ratio=buff_mem_size−desc_mem_size

For example, if 512MB is needed across all queues and 2MB of descriptor memory space is needed, descriptor memory size, buffer memory size, and size ratio can be calculated as illustrated below.

desc_mem_size=Log 2[calculated descriptor space]

=Log 2[2MB]

=21 buff_mem_size=Log 2[allocated buffer space]

=Log 2[512MB]

=29 size_ratio=buff_mem_size−desc_mem_size

=29−21

=8

Given the three parameter calculations, a descriptor address can be calculated from the buffer address. A buffer address can be calculated from a descriptor address. For purposes of discussion, when calculating a descriptor address from a buffer address, it is presumed that the descriptor address being calculated is for the descriptor associated with a buffer located at the specified buffer address. Similarly, when calculating a buffer address from a descriptor address, it is presumed that the buffer address being calculated is for the buffer associated with the descriptor located at the specified descriptor address. In any case, a descriptor address can be calculated as follows.

desc_addr=desc_base_addr[31:desc_mem_size]&buff_addr[buff_mem_size−1:size_ratio]

desc_addr=desc_base_addr[31:21]&buff_addr[28:8]

In this example, as dictated by the expression above, the descriptor address is calculated by concatenating bits 31:21 of the descriptor base address with bits 28:8 of the buffer address, thereby providing a 32 bit descriptor address.

A buffer address is calculated from a descriptor address as follows.

buff_addr=buff_base_addr[31:buff_mem_size] &desc_addr[desc_mem_size−1:0]&zeros[size_ratio−1:0]

buff_addr=buff_base_addr[31:29]&desc_addr[20:0] &"00000000"

The buffer address is calculated by concatenating bits 31:29 of the buffer base address with bits 20:0 of the descriptor address with "00000000". It should be appreciated that the equations are independent of the size of individual buffers. This independence allows each queue to utilize a unique buffer size if so desired.

For purposes of illustration, consider an example in which a same buffer size is to be utilized across all queues. The allocated memory space is 512MB. The configured buffer size is 4096 bytes. The configured descriptor size is 16 bytes, i.e., four words. Of the four words configured for each descriptor, only one word is utilized by the DMA to add buffer control information such as start/end of packet and valid bytes in the buffer. The other three words get allocated for an extended descriptor field. The extended descriptor field can be used by the application circuits to exchange application-specific control information between the application interface and the processor. Given the foregoing, the total buffers (total number of buffers) and total space required for descriptors is calculated as follows.

Total Buffers=Total Descriptors

=Allocated Space/Buffer Size

=512MB/4096

=128K

Total Space Required for Descriptors=Total Descriptor×Descriptor Size

=128K×16B

=2MB

Consider again the description address expression below.

desc_addr=desc_base_addr[31:desc_mem_size]&buff_addr[buff_mem_size−1:size_ratio]

In this example, where same size buffers are used, descr_base_addr[31:desc_mem_size] follows rule 2 where the descriptor memory base address is at the $2^M$ boundary of the calculated descriptor space. The descriptor base address will always be a constant. The MSB of buff_addr[buff_mem_size−1] follows rule 1. The buffer memory base address should be at $2^N$ the boundary of the allocated buffer space. Anything above buff_mem_size will be a constant and can be ignored. The LSB of buff_addr[size_ratio] will always match Buffer_Memory_Size−Descriptor_Memory_Size. Thus, buff_mem_size=LOG 2[4096]=12 bits. Desc_mem_size=LOG 2[16]=4 bits. The LSB of buff_addr=12−4=8. As such, the 4 KB buffer address always increments at the 12 bit boundary. The descriptor addresses for the 16 byte descriptors will always increment at the 4 bit boundary. Adding four trailing zero's to the buffer address increment boundary, i.e. [11:8], gives the address of the descriptor increment boundary.

In another example, where each queue has a unique buffer size, the allocated memory space is again 512MB. The configured buffer sizes are 512 bytes, 1024 bytes, 2048 bytes, and 4096 bytes. The descriptor size is 16 bytes. Given the foregoing, the total buffers (total number of buffers) and total space required for descriptors is calculated as follows.

Total Buffers=Total Descriptors

=Allocated Space/Minimum Buffer Size

=512MB/512

=1 M

Total Space Required for Descriptors=Total Descriptor×Descriptor Size

=1 M×16B

=16MB

In the case of variable sized buffers, e.g., where the buffer sizes are 512 bytes, 1 KB, and 4 KB, the minimum buffer size=LOG 2[512]=9 bits. The descriptor size=LOG 2[16]=4 bits. The LSB of buff_addr=9−4=5. Since any amount of buffers can be allocated to any queue, the descriptor memory allocation is done considering smallest buffer size. For variable buffer sizes the equation creates a LSB position shift and with 16 byte buffer descriptors. For the 512 byte buffer Size, the 4 LSBs [8:5] will always remain 0. For the 1024 byte buffer size, the 5 LSBs [9:5] will always remain 0. For the 4 KB buffer size, the 7 LSBs [11:5] will always remain 0.

In the case of variable sized buffers, the expressions effectively under-utilize the descriptor memory for larger buffer sizes. Still, a one-to-one relationship is maintained between buffers and descriptors. For example, for a 4 KB buffer size, only first 16 bytes will be written or read from 128 bytes of a descriptor stored in descriptor memory.

Rule 3 ensures that the equations hold true for any start address and rollover address that is dynamically configured for a queue during operation of DMA block 210. For dynamic or random buffer allocation, following rule 3 allows buffers to be allocated randomly at a granularity of the largest buffer size.

In the examples described in this specification, the buffer size is restricted to $2^N$ in bytes. More particularly, the buffer sizes can be 512 (N=9), 1024 (N=10), 2048 (N=11), and 4096 (N=12). The descriptor size is also restricted to have a size in bytes that is $2^M$ where the minimum value of M is 2. More particularly, the descriptor sizes can be 4 bytes (M=2), 8 bytes (M=3), 16 (M=4), and 32 (M=5), for example.

In one aspect, a designer can provide one or more inputs detailing particular aspects of DMA block 210 to a computer aided design (CAD) tool. The CAD tool can generate configuration data specifying a hardware configuration for DMA block 210 based upon the received user inputs. The user inputs conform to the various rules described above and to be described in further detail below.

Figure 3:
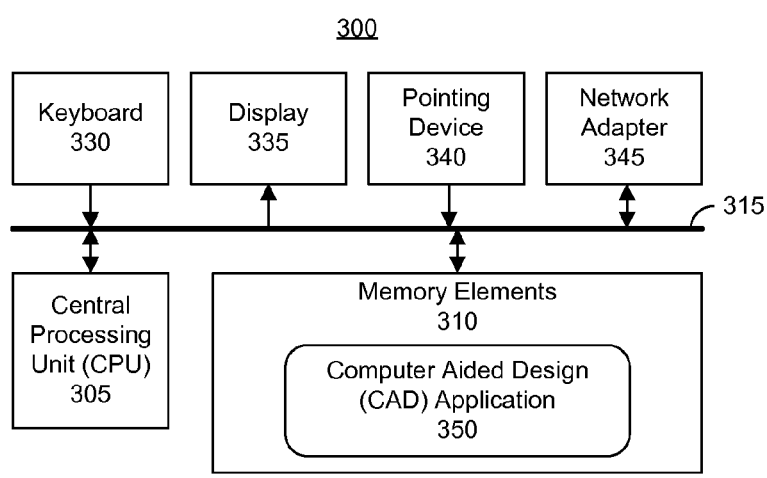
FIG. 3 is a block diagram illustrating an exemplary implementation of a data processing system.

FIG. 3 is a block diagram illustrating an exemplary implementation of a data processing system (system) 300. System 300 includes at least one central processing unit (CPU), 305 coupled to memory elements 310 through a system bus 315 or other suitable circuitry. System 300 can store program code within memory elements 310. CPU 305 executes the program code accessed from memory elements 310 via system bus 315. In one aspect, system 300 is implemented as a computer that is suitable for storing and/or executing program code. It should be appreciated, however, that system 300 can be implemented in the form of any system including a CPU and memory that is capable of performing the functions described within this specification.

Memory elements 310 include one or more physical memory devices such as, for example, local memory and one or more bulk storage devices. Local memory refers to random access memory or other non-persistent memory device(s) generally used during actual execution of the program code. Bulk storage device(s) can be implemented as a hard disk drive (HDD), solid state drive (SSD), or other persistent data storage device. System 300 also can include one or more cache memories (not shown) that provide temporary storage of at least some program code in order to reduce the number of times program code must be retrieved from bulk storage device during execution.

Input/output (I/O) devices such as a keyboard 330, a display 335, and a pointing device 340 optionally can be coupled to system 300. The I/O devices can be coupled to system 300 either directly or through intervening I/O controllers. A network adapter 345 also can be coupled to system 300 to enable system 300 to become coupled to other systems, computer systems, remote printers, and/or remote storage devices through intervening private or public networks. Modems, cable modems, Ethernet cards, and wireless transceivers are examples of different types of network adapter 345 that can be used with system 300.

As pictured in FIG. 3, memory elements 310 can store a CAD application 350. CAD application 350, being implemented in the form of executable program code, is executed by system 300. As such, CAD application 350 is considered part of system 300. CAD application 350, in general, operates upon a received user inputs specifying parameters of a circuit design or portion thereof and generates a programmatic description of a circuit design or portion thereof. The generated programmatic description can be specified in the form of a core, a netlist, a configuration bitstream, a hardware description language, or other format specifying hardware structure and architecture for an electronic system or portion thereof such as a DMA block as described within this specification. CAD application 350, any data items operated upon by CAD application 350, are functional data structures that impart functionality when employed as part of system 300.

FIG. 4 is a flow chart illustrating an exemplary method 400 of processing hardware generation parameters. Method 400 is performed by a system such as system 300 of FIG. 3, e.g., a CAD tool. Accordingly, method 400 can begin in block 405 where the system receives a user input specifying a size of the buffer memory that is required across all applications.

In block 410, the system receives a user input specifying a base address for the buffer memory. The base address received should conform to rule 1 specified above. The system can enforce this rule upon the received user input. In block 415, the system receives a user input specifying a buffer size for each queue. More particularly, the user input specifies the size of individual buffers used by each queue. In block 420, the system receives a user input specifying a base descriptor size for all queues. The base descriptor size is the size of the individual descriptors used for the queues.

In block 425, the system determines a descriptor memory size. In one aspect, the system calculates the descriptor memory size by multiplying the buffer memory size by the descriptor size (individual descriptor size) and dividing the product by the minimum buffer size. The minimum, or smallest, buffer size is the smallest buffer size specified in block 415 when the system receives a user input specifying the buffer size for each queue. In block 430, the system receives a user input specifying a base address for the descriptor memory. The base address for the descriptor memory should conform to rule 2 specified above. The system can enforce this rule upon the received user input.

In block 435, the system determines the size ratio for each queue. In block 440, the system generates address circuitry, e.g., a programmatic description of the addressing circuitry, in accordance with the received parameters. The addressing circuitry can implement relative addressing described in which an address of a descriptor can be derived from an address of a buffer and an address of a buffer can be derived from an address of a descriptor.

The hardware generation parameters described with reference to FIG. 4 are needed for the DMA block so that the relative addressing equations can be built in hardware. The hardware generation parameters can be determined based upon the maximum number of applications the system (e.g., the DMA block) is built for, the amount of available memory space for user data, and the optimum buffer/descriptor size for each application. It should be appreciated that the above hardware generation parameters do not include information about how much memory is actually allocated for each individual application.

FIG. 5 is a block diagram illustrating a memory 500 with an exemplary base address configuration. The base address configuration of FIG. 5 is determined using the techniques described within this specification. As shown, memory 500 is an external memory that is not located on the same IC as the DMA block. The descriptor memory is not immediately adjacent to the buffer memory.

FIG. 6 is a block diagram illustrating memories 600 and 605 with another exemplary base address configuration. The base address configuration of FIG. 6 is determined using the techniques described within this specification. As shown, memory 600 is an on-chip memory that is located on the same IC as the DMA block. Memory 600 includes the descriptor memory. Memory 605 is a different memory, e.g., an external memory, which includes the buffer memory.

FIG. 7 is a block diagram illustrating a memory 700 with another exemplary base address configuration. The base address configuration of FIG. 7 is determined using the techniques described within this specification. Memory 700 can be an internal memory or an external memory. In this case, the buffer memory is immediately adjacent to the descriptor memory.

Descriptor memory size is calculated using the minimum buffer size. Accordingly, dynamic memory allocation can be performed by the DMA block during operation so that a variable amount of memory within the address map of the buffer memory, i.e., within the base and high address of buffer memory, can be allocated to any queue. It should be appreciated that a portion of memory that is allocated for a queue does not overlap with memory allocated to any other queue. Queues configured with larger buffer sizes get larger descriptor space for each buffer. The descriptor size for a queue can be calculated as the product of the buffer size of the queue and the configured descriptor size, divided by the minimum buffer size.

TABLE 1

| Queue No. | Buffer Size (bytes) | Configured Descriptor Size (bytes) | | |
|---|---|---|---|---|
| | | 4 | 8 | 16 |
| 1 | 512 | 4 | 8 | 16 |
| 2 | 1024 | 8 | 16 | 32 |
| 3 | 4096 | 32 | 64 | 128 |

Table 1 illustrates 3 examples for configured descriptor size and actual descriptor size allocated to each queue based upon the buffer size of the queue.

For every 512 bytes, which is the minimum buffer size, 16 bytes of configured descriptor size are provided in descriptor memory. This relationship ensures a one-to-one relationship between buffer addresses and descriptor addresses. As such, a 4096 byte sized buffer will use 16×(4096/512)=128 bytes of buffer descriptor space per descriptor. Only the first 16 bytes out of the 128 bytes, however, are used for the 4096 byte buffer. This relationship holds when the start and end space of the allocation is in the maximum buffer size, i.e., 4096 bytes, in accordance with rule 3. This condition permits a variable amount of memory allocation or de-allocation for any queue within the base address and high address of the buffer memory.

Table 2 illustrates an example in which a one one-to-one relationship between buffer addresses and descriptor addresses is maintained despite using queues of different size buffers.

TABLE 2

| Total Buffer Bytes | Buffer Size | Descriptor Size | Total Descriptor Bytes |
|---|---|---|---|
| 4096 | 512 | 16 | 128 |
| | 512 | 16 | |
| | 512 | 16 | |
| | 512 | 16 | |
| | 512 | 16 | |
| | 512 | 16 | |
| | 512 | 16 | |
| | 512 | 16 | |
| 4096 | 1024 | 32 | 128 |
| | 1024 | 32 | |
| | 1024 | 32 | |
| | 1024 | 32 | |
| 4096 | 2048 | 64 | 128 |
| | 2048 | 64 | |
| 4096 | 4096 | 128 | 128 |

Once system memory is partitioned and the hardware for the DMA module is generated, memory allocation for queues is done at runtime of the system. Memory allocation can be performed dynamically for each application. In one aspect, for example, memory allocation is performed by the processor dynamically during runtime. The minimum amount of space, or granularity of space allocation, for each queue should follow rule 3 discussed above. Queues can be dynamically activated, i.e., allocated, or de-activated, i.e., de-allocated, by the system. The maximum amount of memory allocation for each queue can be determined per the application needs. The processor of the system provides memory space for each queue in terms of defining the start and rollover address for a circular queue. The DMA block performs memory space management in that the DMA block generates and manages the buffer and descriptor addresses for each of the activated queues.

FIG. 8 is a table 800 illustrating descriptor size compression as implemented by DMA block 210 of FIG. 2. The top shaded row labeled "Bits" is not part of the descriptor information. Rather, the top shaded row specifies the number of bits occupied by the various data items located beneath in columns. For example, each of "Load," "Rollvr," "Start," and "Last" is 1 bit. "Bytes" is 12 bits. Each of "TDEST" and "TID" is 8 bits. As such, each row defines a 32 bit word.

In one aspect, word 1 and word 2 are the "control information" for a buffer and is the only data written, for a buffer, to descriptor memory. The control information is one word that is generated by DMA block 210. Extended descriptor fields are provided by the application interface or the processor. Extended descriptor fields are used by the application circuits to exchange application-specific control information between application interfaces and the processor via DMA block 210. By storing only control information as a descriptor and reconstructing the current buffer address field and the next descriptor address field within DMA block 210, the amount of memory required for descriptor storage is significantly reduced. Further, the bandwidth required for reading and/or writing descriptors to descriptor memory is reduced.

Word 2 is a field that can be extended up to 7 words by an application circuit. The size of the extended descriptor field allowed equals the descriptor size hardware parameter—4 bytes. As noted, the descriptor size is restricted to have a size in bytes that is $2^M$, where the minimum value of M is 2. Further, the available descriptor sizes are 4, 8, 16 and 32 bytes. While word 2 is written to descriptor memory, writing the extended descriptor fields to descriptor memory as the control information to form a descriptor of is optional. Still, in another aspect, word 1 is the "control information" for a buffer and is the only data written for a buffer to descriptor memory when the descriptor size is set to 4 bytes.

FIG. 9 is a table 900 describing the various items of information for a descriptor. In one aspect, a descriptor can be defined to include only control information as written to descriptor memory and described with reference to FIG. 8. The remaining portions, e.g., current buffer address and next descriptor address, are not stored. One or more or all of the aforementioned quantities can be calculated by DMA block 210 using the various expressions previously described. If, however, descriptor size compression is not utilized, more than the control information can be written as a descriptor to descriptor memory.

Figure 10:
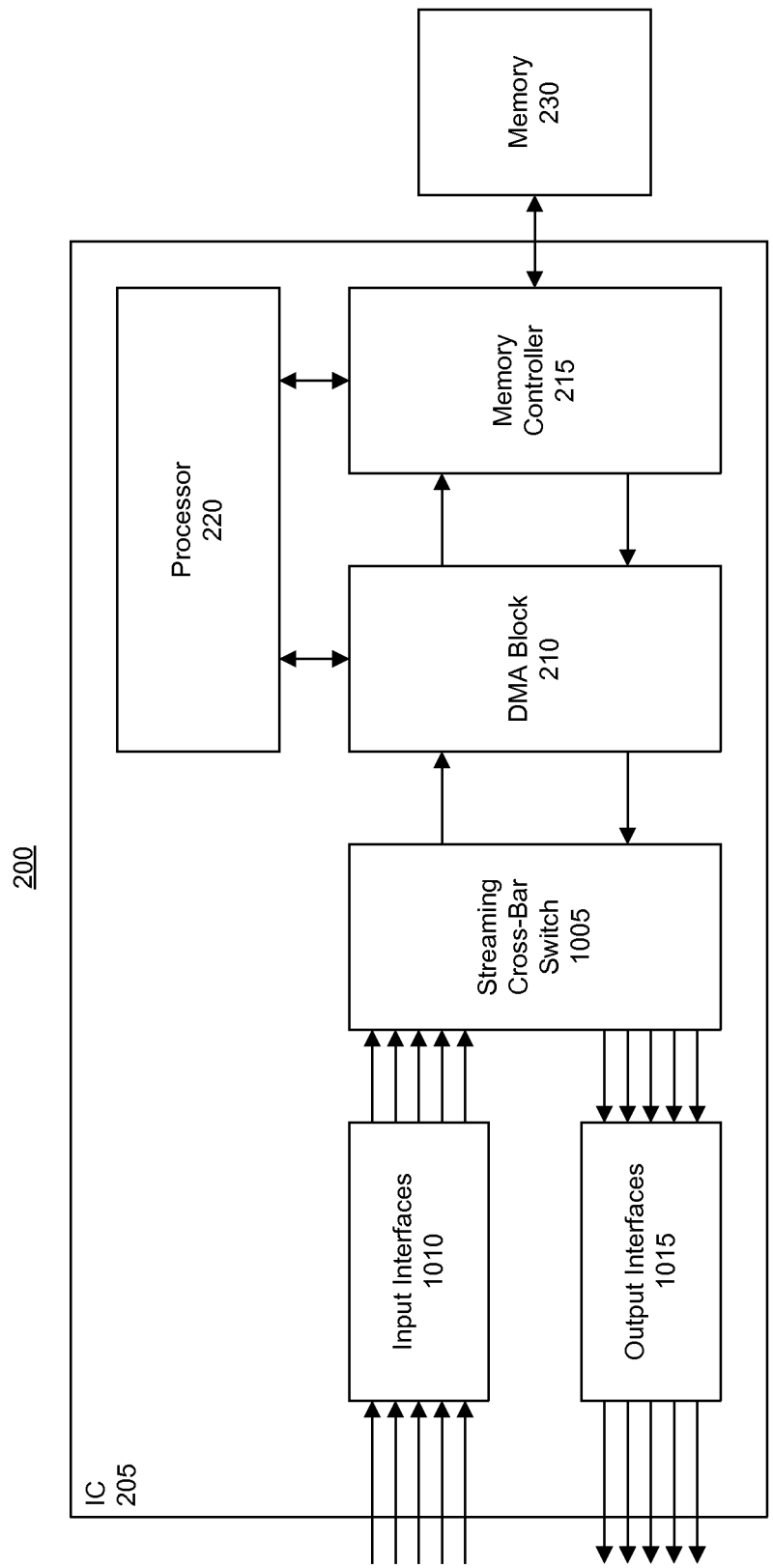
FIG. 10 is a block diagram illustrating a more detailed illustration of the system described with reference to FIG. 2.

FIG. 10 is a block diagram illustrating a more detailed illustration of system 200 of FIG. 2. As shown, DMA block 210 is coupled to a streaming cross-bar switch 1005. Streaming cross-bar switch 1005 is connected to one or more input interfaces 1010 and one or more output interfaces 1015 (e.g., collectively also referred to as application interfaces). Examples of input interfaces 1010 and output interfaces 1015 include, but are not limited to, Peripheral Component Interconnect Express (PCIe), Universal Serial Bus (USB), Ethernet, or the like. Each of input interfaces 1010 and/or output interfaces 1015 can have a different bandwidth, packet size, and/or priority for processing. It should be appreciated that input interfaces 1010 can be the same as output interfaces 1015 or different. The appropriate processing and output interface 1015 can be determined according to the input queue identifier (TID) or output queue identifier (TDEST) provided for DMA block 210.

In operation, an input interface 1010 sends packets to streaming cross-bar switch 1005. Streaming cross-bar switch 1005 implements an arbitration scheme to forward data received from input interfaces 1010 to DMA block 210. In one aspect, streaming cross-bar switch 1005 breaks packets into buffers, which reduces system storage and provides better arbitration. An implementation in which streaming cross-bar switch 1005 breaks data into buffers, however, typically is system-specific. The bandwidth supported by streaming cross-bar switch 1005 should be sufficient to handle the combined bandwidths of each of input interfaces 1010 and each of output interfaces 1015.

DMA block 210 receives data from streaming cross-bar switch 1005. For each amount of data received corresponding to a buffer, DMA block 210 writes a buffer and a descriptor for the buffer to memory 230 via memory controller 215. In the example illustrated, DMA block 210 performs hardware buffer and descriptor management by maintaining buffer and descriptor pointers locally on a per queue basis.

In addition, DMA block 210 locally caches each descriptor that is provided to processor 220. DMA block 210 caches descriptors that are outstanding, i.e., used, for the queue. The maximum number of descriptors cached in the example presented in FIG. 10 is 32. It should be appreciated, however, that fewer or more descriptors can be cached depending upon the size of cache memory utilized within DMA block 210.

By maintaining a local cache of descriptors, processor 220 is able to fetch descriptors directly from DMA block 210 without accessing memory 230. Accordingly, processor 220 is able to operate upon descriptors and the address and/or control information stored therein without having to access memory 230. Thus, the load placed on memory 230 can be significantly reduced since descriptor memory within memory 230 is only read and/or written by DMA block 210.

Having accessed any needed descriptor(s), processor 220 can fetch any required data, e.g., buffers, from memory 230. In the case of a networking application, for example, the packet header typically includes the only bytes that need to be processed or modified by processor 220. Processor 220, having operated upon the fetched data from memory 230, writes the resulting data back to memory 230 to the appropriate buffer. Thus, processor 220 performs data processing using the buffers from memory 230 and descriptor processing using the cached descriptors within DMA block 210.

Processor 220, in processing the descriptor, can modify the descriptor. Processor 220, for example, can add information such as an instruction to the application interface by updating extended descriptor fields. Processor 220, after operating upon the descriptor, writes the processed descriptor back to DMA block 210. The load on processor 220 is reduced since processor 220 does not perform any descriptor address management. In one aspect, processor 220 or another external processing engine performs packet scheduling operations by writing the descriptor to DMA block 210 only when the data stored in the associated buffer needs to be fetched from memory 230.

DMA block 210 uses the descriptor written by processor 220 to fetch the data stored in the buffer corresponding to the descriptor from memory 230. DMA block 210 then forwards the fetched data to streaming cross-bar switch 1005. Streaming cross-bar switch 1005 then forwards the data received from DMA block 210 to an output interface 1015. In one aspect, streaming cross-bar switch 1005 can accumulate sufficient data to formulate a packet before sending the data to output interface 1015.

Figure 11:
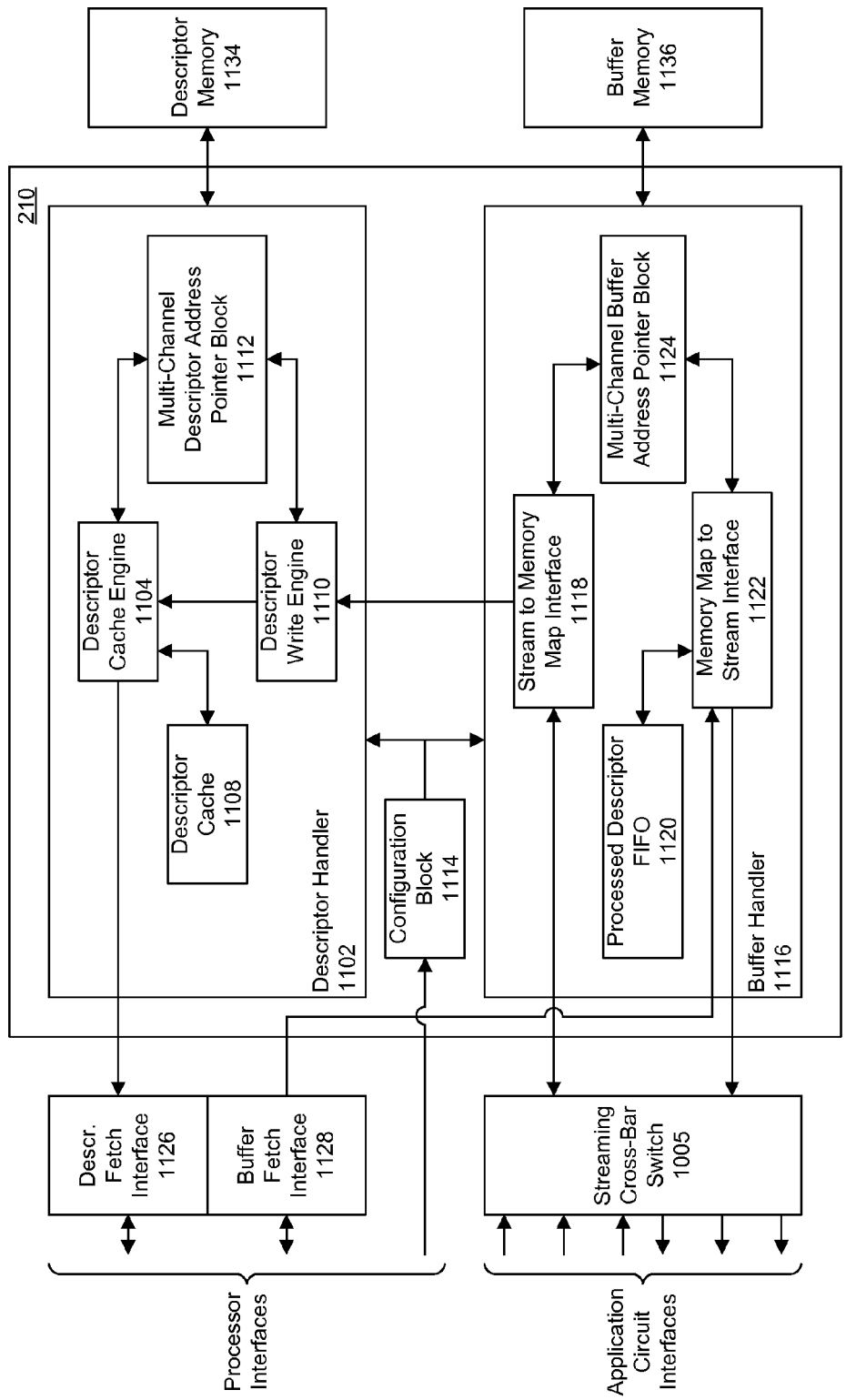
FIG. 11 is a block diagram illustrating an exemplary implementation of the DMA block described with reference to FIGS. 2 and 10.

FIG. 11 is a block diagram illustrating an exemplary implementation of DMA block 210 of FIGS. 2 and 10. For purposes of clarity, the memory controller between DMA block 210 and the memories depicted in FIG. 11 is not shown. As pictured, DMA block 210 includes a descriptor handler 1102, a configuration block 1114, and a buffer handler 1116. DMA block 210 supports multiple queues and maintains information for each queue internally. As such, DMA block 210 provides information such as queue full, and queue empty to streaming cross-bar switch 1005 on a per queue basis. DMA block 210 further provides interrupts to the processor. DMA block 210 supports two data paths. One data path is an application circuit interface to memory data path. The other data path is a memory to application circuit interface data path. Each data path can service a different queue concurrently.

In operation, streaming cross-bar switch 1005 sends a fixed or random sized packet and extended descriptor information to DMA block 210 and, more particularly to stream to memory map interface (interface) 1118. The particular queue associated with the data is determined or specified by the TDEST field. The extended descriptor information is carried on the TUSER bus of streaming cross-bar switch 1005. Interface 1118 is configured to split or scatter data into buffers and write the buffers to buffer memory 1136. Interface 1118 also generates a descriptor for each buffer written to buffer memory 1136. The size of each buffer is determined by the configured per queue buffer size for DMA block 210 as previously discussed.

In the example pictured in FIG. 11, descriptor memory 1134 is an external memory that is separate and distinct from buffer memory 1136. Buffer memory 1136 is also an external memory. As previously discussed, however, descriptor memory 1134 and buffer memory 1136 can be implemented within a same external memory. In still another aspect, descriptor memory 1134 is implemented within the same IC as DMA block 210, while buffer memory 1136 is an external memory.

For each buffer written to buffer memory 1136, interface 1118 increments the current buffer address of the queue stored in multi-channel buffer address pointer block (pointer block) 1124. A queue identifier is provided to indicate the particular queue for which the pointer is being incremented. Next buffer addresses are stored on a per queue basis in pointer block 1124. While incrementing the current buffer address, interface 1118 checks for the buffer start and rollover address within configuration block 1114 for the current queue.

Configuration block 1114 stores configuration data for DMA block 210. In one aspect, configuration block 1114 includes a buffer configuration memory. The buffer configuration memory is dynamically configurable, e.g., writable, by the processor. The buffer configuration memory can be implemented as a RAM. The buffer configuration memory can store, for each queue, a valid bit, a reset flag, a queue start address, and a queue rollover address. The reset flag functions as a trigger for resetting the queue under control of the processor.

Configuration block 1114 also can include descriptor configuration memory that is updatable by descriptor write engine 1110. In one aspect, configuration block 1114 includes two instances of the descriptor configuration memory. One instance is used for the application circuit to the descriptor memory data path. The other instance is for the descriptor memory to the application circuit data path. Each instance of the descriptor configuration memory can store, for each queue, a descriptor start address and a descriptor rollover address.

DMA block 210 further can include one or more configuration ROMs (not shown) that store, on a per queue basis, buffer size. The configuration ROM(s) can be preloaded during core generation. For example, the configuration data is generated by a CAD tool and loaded into an IC as illustrated in FIG. 1 to form DMA block 210 using programmable circuitry with the contents of the configuration ROM loaded as described. In one aspect, DMA block 210 includes two configuration ROMs. One configuration ROM is used for the memory to application circuit data path (circular buffer queue write path). The other configuration ROM is used for the memory to application circuit path (circular buffer queue read path).

Pointer block 1124 further provides a queue full signal to interface 1118 when a particular queue is full. Responsive to assertion of the queue full signal from pointer block 1124, interface 1118 asserts a queue full signal to streaming crossbar switch 1005 and the appropriate application circuit (destination).

Interface 1118 sends the descriptor generated for the buffer written to buffer memory 1136 to descriptor write engine 1110. Interface 1118 sets the LOAD bit in the descriptor when the buffer address of the queue matches the start address configured for the queue as determined from configuration block 1114. Interface 1118 also sets the ROLLOVER bit in the descriptor when the buffer address of the queue matches the rollover address for the queue as determined from configuration block 1114. Interface 1118 also appends the extended descriptor fields to the descriptor.

Descriptor write engine 1110 uses the relative addressing scheme previously described to calculate the descriptor address from the buffer address stored within the received descriptor. When the Load bit of the descriptor is set, a descriptor queue start address is calculated using relative addressing. Similarly when the Rollover bit of the descriptor is set, a descriptor queue rollover addresses are calculated using the relative addressing. The descriptor start and rollover address is stored in configuration block 1114. Descriptor write engine 1110 writes the descriptor to descriptor memory 1134 using the generated address. In one aspect, descriptor write engine 1110 writes only buffer control information to descriptor memory 1134 for the descriptor as previously described.

For each descriptor written by descriptor write engine 1110, descriptor write engine 1110 increments the current descriptor address within multi-channel descriptor address pointer block (pointer block) 1112. A queue identifier is provided to indicate the particular queue for which the pointer is being incremented. Pointer block 1112 stores descriptor addresses on a per queue basis. While incrementing the current descriptor address, descriptor write engine 1110 checks configuration block 1114 for a start address and a rollover address, which are specified on a per queue basis for descriptors.

Descriptor cache engine 1104 uses the read/write descriptor addresses within pointer block 1112 to determine outstanding descriptors on a per queue basis. Outstanding descriptors are descriptors corresponding to used buffers within buffer memory 1136. Descriptor cache engine writes the outstanding descriptors to descriptor cache 1108. For the example illustrated in FIG. 11, the number of descriptors cached for each queue can be set to 32. The maximum number of descriptors cached, whether total or on a per queue basis, is not intended to be restricted to the example provided. Fewer or more descriptors can be cached, whether in total or on a per queue basis, as may be required.

In one aspect, upon storing a descriptor within descriptor cache 1108 when the descriptor is formed of only the control information, one or more or all of the additional words illustrated in FIG. 8 are added to the descriptor so that the descriptor size is essentially de-compressed by descriptor cache engine 1104.

Accordingly, descriptor cache 1108 stores outstanding descriptors for each queue. When descriptor cache 1108 is not empty, an interrupt for the queue is set for the processor. The processor can fetch a descriptor from descriptor cache 1108 by way of descriptor cache engine 1104 based on, and responsive to, the interrupt that is generated. For example, descriptor cache engine 1104, responsive to the processor, retrieves a descriptor from descriptor cache 1108 and provides the descriptor to descriptor fetch interface 1126 for the processor.

The processor can use the address and other control fields of the descriptor read from descriptor cache 1108 to fetch and process data from the buffer associated with the descriptor (e.g., via the memory controller). The processor reads the buffer from buffer memory 1136. The processor writes the processed data back to buffer memory 1136. In one aspect, the buffer fetch operation is initiated responsive to the processor writing the processed descriptor back to memory map to stream interface (interface) 1122. The processed descriptor fields can be used to fetch data associated with the descriptor. The processed descriptor can add information such as an instruction to the application interface through the extended descriptor fields.

Processed descriptors are provided to interface 1122. Interface 1122 uses the buffer address and the number of bytes from the descriptor to read data from buffer memory 1136. Generation of a read request for buffer memory 1136 does not incur much latency or processing. Obtaining data from buffer memory 1136, however, may take several clock cycles, e.g., more latency than generation of the read request. Accordingly, after the read request is generated and provided to buffer memory 1136 (via the memory controller not shown), the descriptor is pushed onto processed descriptor FIFO 1120 to allow a next read request to be generated.

When data is received in response to a read request, processed descriptor FIFO 1120 is read for buffer control information. Fields such as SOP/EOP/TID/TDEST are appended to the buffer control information and then provided to interface 1122. Interface 1122 uses the control information in the descriptor to append information such as the start and/or end of the packet, the extended descriptor fields, etc., and then forwards the data to streaming cross-bar switch 1105. Streaming cross-bar switch 1105 then forwards the data and extended descriptor field to the correct egress application according to the destination identifier included within the data.

FIG. 12 is a flow chart illustrating an exemplary method 1200 of data transfer from an application circuit to memory. Method 1200 is performed by a DMA block as described within this specification. In block 1205, a buffer queue start address and rollover address can be set within the DMA block. As noted, the DMA block can dynamically allocate (and de-allocate) memory to implement the queue. In block 1210, the DMA block receives a data packet from an application circuit. For example, the buffer handler receives a data packet. In block 1215, the buffer handler writes the received data to one or more buffers in buffer memory.

In block 1220, the buffer handler generates a descriptor for each buffer that is written. The descriptor includes the buffer control information and any extended descriptor fields. In block 1225, the buffer handler increments to the next buffer address that is to be used for the application circuit to memory path. In block 1230, a descriptor queue start address and rollover address are determined or generated. The queue start address is determined when the load bit is set in the descriptor. The rollover address is determined when the rollover bit is set in the descriptor.

In block 1235, the descriptor handler, knowing the buffers that were written in block 1215, and having received the generated descriptors, generates a descriptor address for each descriptor generated in block 1220. In generating the descriptor addresses, the descriptor handler uses relative addressing as previously described.

In block 1240, the descriptor handler writes the descriptors to the descriptor memory using the generated descriptor addresses. It should be appreciated that when descriptor compression is activated, only buffer control information, as previously described, is written to descriptor memory. In block 1245, for the application circuit to memory path, the next descriptor address is incremented.

FIG. 13 is a flow chart illustrating an exemplary method 1300 of descriptor caching. Method 1300 is performed by a DMA block as described within this specification. In block 1305, the descriptor handler determines the outstanding, i.e., used, descriptors for the queues. In block 1310, the descriptor handler fetches the outstanding descriptors for the queue identified in block 1305 from the descriptor memory. As noted, the descriptor handler stores an indication of the particular descriptors that are used.

In block 1315, the next descriptor address for the memory to application path is incremented. In block 1320, the descriptor handler adds the current buffer address to the descriptors in the descriptor cache for the queues.

Figure 14:
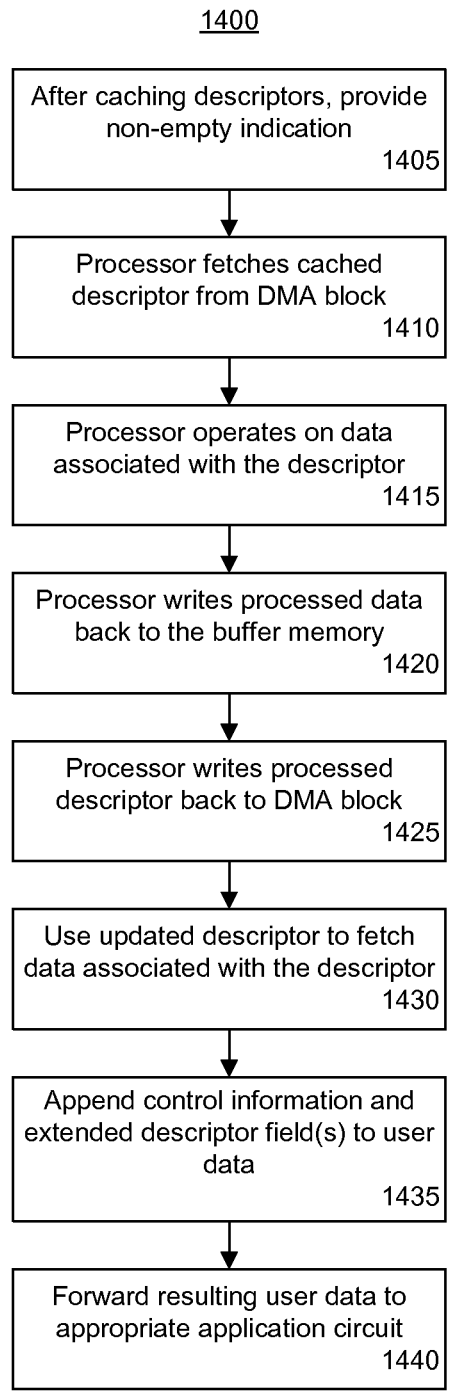
FIG. 14 is a flow chart illustrating an exemplary method of data transfer to an application circuit.

FIG. 14 is a flow chart illustrating an exemplary method 1400 of data transfer to an application circuit. Method 1400 is performed by a DMA block as described within this specification. In block 1405, when the DMA has cached one or more descriptors, the DMA block provides a non-empty indication, e.g., an interrupt, to the processor. In response to the non-empty indication, the processor or, for example, a descriptor processing engine, performs descriptor processing. The processor, in block 1410, fetches a descriptor from the descriptor cache. The processor can operate on the fetched descriptors outside of the DMA block. The processor can utilize the address and other control fields in the descriptor to process the user data stored in the buffer associated with the descriptor.

In block 1415, the processor operates on the data, e.g., the data stored in the buffer memory associated with the fetched descriptor. In block 1420, the processor writes the processed data back to the buffer memory. In block 1425, the processor writes the processed descriptor back to the DMA block. For example, the processor writes the processed descriptor back to the memory map to stream interface. Responsive to the processed descriptor being written to the memory map to stream interface, the DMA block initiates a buffer operation.

In block 1430, the DMA block uses the updated descriptor to fetch data associated with the descriptor from the buffer memory. For example, responsive to the processed descriptor being written to the memory map to stream interface, the DMA block uses the updated descriptor to fetch the buffer associated with the processed descriptor. The DMA block identifies the particular queue associated with the data from the TDEST field, which specifies the particular egress application circuit from the processed descriptor.

In block 1435, the DMA block appends control information and extended descriptor field(s) to the retrieved data. For example, the DMA block can append information such as start of the packet, end of the packet, or one or more of the extended descriptor fields to the user data. In block 1440, the DMA block forwards the resulting user data to the appropriate application circuit.

When the queue is empty, as indicated by the queue empty signal generated by the descriptor handler, external circuitry, whether the application circuit, the processor, or other circuitry, can exercise a queue reset signal thereby de-allocating the space occupied by the queue that is now empty.

For each of FIGS. 15-18, the tables shown assign the buffer memory address, i.e., the buffer base address and the buffer high address, and calculate the corresponding descriptor memory address, i.e., the descriptor base address and the descriptor high address. As discussed, using the expressions described in this specification for performing relative addressing allows the buffer address to be derived from the descriptor address and vice versa.

FIG. 15 is a table 1500 illustrating relative addressing for a variable size buffer space. Table 1500 illustrates a 512MB buffer space in which descriptor memory is allocated in the buffer space. In the example shown, the configured buffer space is 512MB. The configured buffer base address is E0000000. The configured minimum buffer size is 2048 bytes. The configured maximum buffer size is 4096 bytes.

The configured descriptor size is 8 bytes. The calculated descriptor space is 2 MB. The configured descriptor base address is F0000000.

FIG. 16 is a table 1600 illustrating relative addressing for a variable size buffer space. Table 1600 illustrates a 512MB buffer space in which descriptor memory is allocated in the buffer space. In the example shown, the configured buffer space is 512MB. The configured buffer base address is E0000000. The configured minimum buffer size is 1024 bytes. The configured maximum buffer size is 4096 bytes. The configured descriptor size is 4 bytes. The calculated descriptor space is 2 MB. The configured descriptor base address is F0000000.

FIG. 17 is a table 1700 illustrating relative addressing for a fixed size buffer space. Table 1700 illustrates a 512MB buffer space in which descriptor memory is allocated in the buffer space. In the example shown, the configured buffer space is 512MB. The configured buffer base address is E0000000. The configured minimum buffer size is 512 bytes. The configured maximum buffer size is 512 bytes. The configured descriptor size is 32 bytes. The calculated descriptor space is 32MB. The configured descriptor base address is F0000000.

FIG. 18 is a table 1800 illustrating relative addressing for a fixed size buffer space. Table 1200 illustrates a 512MB buffer space in which descriptor memory is allocated in the buffer space. In the example shown, the configured buffer space is 512MB. The configured buffer base address is E0000000. The configured minimum buffer size is 4096 bytes. The configured maximum buffer size is 4096 bytes. The configured descriptor size is 16 bytes. The calculated descriptor space is 2MB. The configured descriptor base address is F0000000.

For purposes of explanation, specific nomenclature is set forth to provide a thorough understanding of the various inventive concepts disclosed herein. The terminology used herein, however, is for the purpose of describing particular embodiments only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects disclosed within this specification can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a device such as a computer program product, which includes all the features enabling the implementation of the methods described herein. The device can include a data storage medium, e.g., a non-transitory computer-usable or computer-readable medium, storing program code that, when loaded and executed in a system including a processor, causes the system to initiate and/or perform at least a portion of the functions or operations described within this specification. In another aspect, the computer-readable program code can be configuration data that, when loaded in an IC, implements one or more circuit structures described within this specification within the IC. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various features disclosed herein. In this regard, each block in the flowchart or block diagrams may represent a module, segment, or portion of code, which includes one or more executable instructions for implementing the specified logical function(s).

It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing," "computing," "calculating," "determining," "displaying," "generating," or the like, refer to the action and processes of a data processing system, e.g., a computer system, or other circuitry, that manipulates and transforms data represented as physical (electronic) quantities within the system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

One or more features disclosed within this specification can be embodied in other forms without departing from the spirit or essential attributes thereof. Accordingly, reference should be made to the following claims, rather than to the foregoing specification, as indicating the scope of the such features and implementations.

What is claimed is:

1. A direct memory access circuit, comprising:
a buffer handler configured to store received data within a buffer in a buffer memory coupled to the direct memory access circuit and to generate a descriptor for the buffer; and
a descriptor handler coupled to the buffer handler;
wherein the descriptor handler is configured to determine a descriptor address for the descriptor and to store the descriptor at the determined descriptor address within a descriptor memory coupled to the direct memory access circuit.

2. The direct memory access circuit of claim 1, wherein the descriptor handler comprises:
a descriptor cache engine; and
a descriptor cache coupled to the descriptor cache engine;
wherein the descriptor cache engine is configured to store the descriptor within the descriptor cache; and
wherein a processor accesses the descriptor from the descriptor cache via the descriptor cache engine without accessing the descriptor memory.

3. The direct memory access circuit of claim 1, wherein the descriptor handler comprises:
a descriptor write engine configured to implement descriptor size compression by storing only control information within the descriptor memory as the descriptor;
wherein the control information does not include the address of the buffer.

4. The direct memory access circuit of claim 1, wherein the address of the buffer is determined independently of a size of individual buffers used by the direct memory access circuit.

5. The direct memory access circuit of claim 1, wherein the address of the descriptor is determined independently of a size of individual buffers used by the direct memory access circuit.

6. The direct memory access circuit of claim 1, wherein:
the direct memory access circuit manages a plurality of queues;
the descriptor and buffer are part of a first queue of the plurality of queues; and
a second queue of the plurality of queues uses buffers of a size different from the buffer of the first queue.

7. The direct memory access circuit of claim 1, wherein:
the address of the descriptor comprises bits of a descriptor base address selected according to a descriptor memory size, concatenated with bits of the buffer address selected according to a buffer memory size and a size ratio;
the descriptor memory size is Log 2 of a calculated descriptor space;
the buffer memory size is Log 2 of an allocated buffer space; and
the size ratio is the buffer memory size minus the descriptor memory size.

8. The direct memory access circuit of claim 1, wherein:
the address of the buffer comprises bits of a buffer base address selected according to a buffer memory size, concatenated with bits of a descriptor address selected according to descriptor memory size, concatenated with a number of zeros determined according to a size ratio;
the descriptor memory size is Log 2 of a calculated descriptor space;
the buffer memory size is Log 2 of an allocated buffer space; and
the size ratio is the buffer memory size minus the descriptor memory size.

9. The direct memory access circuit of claim 1, wherein:
a size of the buffer memory is a power of 2 specified as $2^N$, wherein N is an integer; and
a base address of the buffer memory comprises zeros for the N least significant bits.

10. The direct memory access circuit of claim 1, wherein:
a size of the descriptor memory is a power of 2 specified as $2^M$, wherein M is an integer; and
a base address of the descriptor memory comprises zeros for the M least significant bits.

11. A method of data processing, comprising:
storing data from a first application circuit within a buffer in a buffer memory;
generating, within a direct memory access circuit, a descriptor for the buffer;
generating, within the direct memory access circuit, an address for the descriptor according to an address of the buffer to which the descriptor corresponds; and
writing the descriptor to a descriptor memory according to the address of each descriptor.

12. The method of claim 11, further comprising:
storing the descriptor in a descriptor cache memory within the direct memory access circuit; and
providing a processor with access to the descriptor cache memory;
wherein the processor fetches the descriptor from the cache memory without accessing the descriptor memory.

13. The method of claim 11, wherein storing the descriptor in the descriptor memory comprises:
only storing control information for the descriptor;
wherein the control information does not include a current buffer address or a next descriptor address.

14. The method of claim 11, further comprising:
storing data from a second application circuit within a second buffer in the buffer memory;
wherein the second buffer is in a different queue than the first buffer and of a different size than the first buffer.

15. The method of claim 11, further comprising:
calculating an address of a selected buffer from an address of a selected descriptor that is associated with the selected buffer.

16. The method of claim 11, wherein the buffer is within a queue that is dynamically allocated by the direct memory access circuit during operation thereof.

17. The method of claim 11, further comprising:
dynamically de-allocating a queue comprising the buffer during operation of the direct memory access circuit.

18. A method of determining addressing for a direct access memory block, the method comprising:
receiving, using a central processing unit, a user input specifying a size of a buffer memory required for managing a plurality of queues;
receiving, using the central processing unit, a user input specifying a buffer size for each queue;
receiving, using the central processing unit, a user input specifying a base descriptor size for individual descriptors of the plurality of queues; and
calculating, using the central processing unit, a size of descriptors stored in the descriptor memory by determining a product of the buffer memory size and the base descriptor size and dividing the product by a smallest buffer size used for the queues.

19. The method of claim 18, further comprising:
calculating a size for total descriptor memory;
receiving, using the central processing unit, a user input specifying a base address for a descriptor memory;
wherein the size of the total descriptor memory is a power of 2 specified as $2^M$, wherein M is an integer and the base address of the descriptor memory comprises zeros for the M least significant bits; and
receiving, using the central processing unit, a base address for the buffer memory;
wherein the size of the buffer memory is a power of 2 specified as $2^N$, wherein N is an integer and the base address of the buffer memory comprises zeros for the N least significant bits.

20. The method of claim 19, further comprising:
calculating a size ratio; and
generating a programmatic description of relative addressing circuitry according to the descriptor memory size, the buffer memory size, and the size ratio.

* * * * *